United States Patent
Shirooka et al.

(10) Patent No.: US 8,863,878 B2
(45) Date of Patent: Oct. 21, 2014

(54) VEHICLE BATTERY MOUNTING STRUCTURE

(75) Inventors: Masakazu Shirooka, Toyota (JP); Akihiro Hirota, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 87 days.

(21) Appl. No.: 13/817,920

(22) PCT Filed: Sep. 2, 2011

(86) PCT No.: PCT/IB2011/002409
§ 371 (c)(1),
(2), (4) Date: Feb. 20, 2013

(87) PCT Pub. No.: WO2012/028956
PCT Pub. Date: Mar. 8, 2012

(65) Prior Publication Data
US 2013/0153318 A1    Jun. 20, 2013

(30) Foreign Application Priority Data
Sep. 3, 2010   (JP) .................................. 2010-198334

(51) Int. Cl.
*B60K 1/04*   (2006.01)
*H01M 2/10*   (2006.01)
*B60L 11/18*  (2006.01)

(52) U.S. Cl.
CPC ........... *B60K 1/04* (2013.01); *B60K 2001/4038* (2013.01); *H01M 2/1083* (2013.01); *Y02T 10/705* (2013.01); *Y02E 60/12* (2013.01); *B60L 11/1877* (2013.01); *Y02T 10/7005* (2013.01)
USPC ...................................................... 180/68.5

(58) Field of Classification Search
CPC ............ B60K 1/04; B60K 2001/0416; B60K 2001/0438; B60L 11/1877; H01M 2/1083
USPC ....................................................... 180/68.5
See application file for complete search history.

(56) References Cited

U.S. PATENT DOCUMENTS

| 7,066,515 | B2 * | 6/2006 | Pierce et al. ..................... 296/21 |
| 7,070,015 | B2 * | 7/2006 | Mathews et al. ............. 180/68.5 |
| 7,921,951 | B2 * | 4/2011 | Watanabe et al. ............ 180/68.5 |
| 8,037,960 | B2 * | 10/2011 | Kiya ............................. 180/68.5 |
| 8,276,697 | B2 * | 10/2012 | Takasaki ...................... 180/68.5 |
| 8,556,016 | B2 * | 10/2013 | Yoda et al. ................... 180/68.5 |
| 2006/0289224 | A1 | 12/2006 | Ono et al. |
| 2008/0274397 | A1 | 11/2008 | Watanabe |
| 2011/0284299 | A1 | 11/2011 | Takahashi et al. |
| 2012/0055722 | A1 | 3/2012 | Matsuzawa et al. |

FOREIGN PATENT DOCUMENTS

| EP | 2 172 356 A1 | 4/2010 |
| EP | 2 447 099 A1 | 5/2012 |
| JP | A-7-156826 | 6/1995 |
| JP | A-2000-238541 | 9/2000 |

(Continued)

*Primary Examiner* — Katy M Ebner
(74) *Attorney, Agent, or Firm* — Oliff PLC (57) ABSTRACT

In a vehicle battery mounting structure, each sidewall of a bracket body has a load-receiving portion extending obliquely from the vehicle vertical direction upper end of a base portion toward the vehicle vertical direction lower end of a flat wall. The load-receiving portion is located between a rear wall and an intermediate beam. Thus, when the intermediate beam is moving toward the vehicle longitudinal direction front side during a rear collision, or the like, a front wall of the intermediate beam smashes against the load-receiving portion.

7 Claims, 8 Drawing Sheets

(56) References Cited

FOREIGN PATENT DOCUMENTS

| | | |
|---|---|---|
| JP | A-2009-83597 | 4/2009 |
| JP | A-2001-138753 | 5/2011 |
| WO | WO 2010/150386 A1 | 12/2010 |
| WO | WO 2010/150447 A1 | 12/2010 |

* cited by examiner

VEHICLE BATTERY MOUNTING STRUCTURE

BACKGROUND OF THE INVENTION

1. Field of the Invention

The invention relates to a vehicle battery mounting structure.

2. Description of Related Art

For example, Japanese Patent Application Publications No. 2001-138753 (JP-A-2001-138753), No. 2009-83597 (JP-A-2009-83597), and No. 07-156826 (JP-A-07-156826) each describe a battery mounting structure in which a battery is mounted under a vehicle floor.

Meanwhile, in a case where a battery is mounted in a vehicle at a position close to a connection beam (intermediate beam) via which left and right rear suspensions are connected to each other, for example, when another vehicle, or the like, rear-ends the vehicle (rear collision), the impact may force the connection beam to move toward the front of the vehicle and then break into a battery frame supporting the battery.

SUMMARY OF THE INVENTION

The invention provides a vehicle battery mounting structure that minimizes the possibility of a connection beam breaking into a battery frame.

An aspect of the invention relates to a vehicle battery mounting structure, having: a battery frame that extends in a lateral direction of a vehicle, is arranged on a vehicle longitudinal direction front side of a connection beam via which a pair of rear suspensions are connected to each other, and supports a battery under a floor of the vehicle; a rear wall that is provided at the battery frame and is arranged, along the lateral direction of the vehicle, between the battery and the connection beam; and a load-receiving portion that is provided at the rear wall, is arranged between the rear wall and the connection beam, and is attached on a body of the vehicle.

According to the vehicle battery mounting structure of the aspect of the invention, the load-receiving portion, which is to be attached to the vehicle body, is provided at the rear wall of the battery frame. The load-receiving portion is arranged between the connection beam and the battery. Therefore, for example, when the connection beam moves toward the vehicle longitudinal direction front side and smashes against the load-receiving portion during a rear collision, or the like, the movement of the connection beam toward the vehicle longitudinal direction front side, that is, the movement of the connection beam in the direction toward the battery is restricted.

According to this structure, for example, since the rigidity of the load-receiving portion is higher than the rigidity of the connection beam, when the connection beam is smashing against the load-receiving portion, the connection beam deforms and thereby absorbs the impact energy. Thus, the impact load transferred to the battery via the load-receiving portion and the battery frame is reduced.

The vehicle battery mounting structure of the aspect of the invention may be such that the load-receiving portion is, as viewed externally in the lateral direction of the vehicle, inclined such that a vehicle vertical direction upper end of the load-receiving portion is located on a vehicle longitudinal direction rear side of a vehicle vertical direction lower end of the load-receiving portion.

According to this structure, since the load-receiving portion is, as viewed externally in the lateral direction of the vehicle, inclined such that the vehicle vertical direction upper end of the load-receiving portion is located on the vehicle longitudinal direction rear side of the vehicle vertical direction lower end of the load-receiving portion, when the connection beam is smashing against the load-receiving portion, the movement of the connection beam toward the vehicle vertical direction upper side can be restricted, as well as the movement of the connection beam toward the vehicle longitudinal direction front side. This minimizes the possibility of the connection beam directly hitting the parts, components, and the like, present on the vehicle vertical direction upper side of the load-receiving portion (e.g., floor panels, vehicle frames).

The vehicle battery mounting structure of the aspect of the invention may be such that the connection beam has, as viewed externally in the lateral direction of the vehicle, an inverted-V-shaped open cross section having an opening at a vehicle vertical direction lower side and an inclination angle of the load-receiving portion with respect to a horizontal plane is larger than an inclination angle, with respect to the horizontal plane, of the connection beam on a side thereof closer to the load-receiving portion.

According to this structure, when the connection beam is moving toward the vehicle longitudinal direction front side during a rear collision, or the like, the load-receiving portion side end of the connection beam smashes against the load-receiving portion before the bent portion, at the top of the inverted-V shape, of the connection beam does. Thus, the load-receiving portion side of the connection beam deforms pivotally about the bent portion such that the opening at the bottom of the inverted-V shape becomes narrower, and thus a greater moment acts on the connection beam. As such, the deformation efficiency of the connection beam is higher, and thus the connection beam can more efficiently absorb the impact energy by deforming.

The vehicle battery mounting structure of the aspect of the invention may be such that the upper end of the load-receiving portion is located on a vehicle vertical direction upper side of a vehicle vertical direction upper end of the connection beam.

According to this structure, the vehicle vertical direction upper end of the load-receiving portion is located on the vehicle vertical direction upper side of the vehicle vertical direction upper end of the connection beam, that is, the load-receiving portion is arranged on the vehicle longitudinal direction front side of the vehicle vertical direction upper end of the connection beam.

If the vehicle vertical direction upper end portion of the load-receiving portion were located on the vehicle vertical direction lower side of the vehicle vertical direction upper end of the connection beam, for example, the connection beam, after smashing against the load-receiving portion, could possibly move beyond the load-receiving portion and smash against the parts, components, and the like, present on the vehicle vertical direction upper side of the load-receiving portion (e.g., floor panels, vehicle frames). Further, during a rear collision, or the like, the connection beam could possibly move toward the diagonally upper side of the vehicle, as well as the vehicle longitudinal direction front side. In such a case, the connection beam is more likely to move beyond the load-receiving portion.

According to the vehicle battery mounting structure described above, on the other hand, the vehicle vertical direction upper end of the load-receiving portion is located on the vehicle vertical direction upper side of the vehicle vertical direction upper end of the connection beam, and this minimizes the possibility of the connection beam moving beyond the load-receiving portion, and thus the possibility of the connection beam directly hitting the parts, components, and the like, present on the vehicle vertical direction upper side of the load-receiving portion.

The vehicle battery mounting structure of the aspect of the invention may be such that the lower end of the load-receiving portion is located on a vehicle vertical direction lower side of a vehicle vertical direction lower end of the connection beam.

According to this structure, the vehicle vertical direction lower end of the load-receiving portion is located on the vehicle vertical direction lower side of the vehicle vertical direction lower end of the connection beam, that is, the load-receiving portion is arranged on the vehicle longitudinal direction front side of the vehicle vertical direction lower end of the connection beam.

If the vehicle vertical direction lower end of the load-receiving portion were located on the vehicle vertical direction upper side of the vehicle vertical direction lower end of the connection beam, for example, the connection beam, after smashing against the load-receiving portion, could possibly smash through the lower side of the load-receiving portion and then smash against the rear wall. Further, during a rear collision, or the like, the connection beam could possibly move toward the diagonally lower side of the vehicle, as well as the vehicle longitudinal direction front side. In such a case, the connection beam is more likely to smash through the lower side of the load-receiving portion.

According to the vehicle battery mounting structure described above, on the other hand, the vehicle vertical direction lower end of the load-receiving portion is located on the vehicle vertical direction lower side of the vehicle vertical direction lower end of the connection beam, and this minimizes the possibility of the connection beam smashing through the lower side of the load-receiving portion, and thus the possibility of the connection beam smashing against the rear wall.

The vehicle battery mounting structure of the aspect of the invention may be such that the rear wall has a projecting portion that projects toward a vehicle longitudinal direction rear side and is formed such that a space is defined between the battery and the projecting portion.

According to this structure, since the rear wall, which is arranged between the battery and the connection beam and extends in the lateral direction of the vehicle, has the projecting portion that projects toward the vehicle longitudinal direction rear side, for example, the connection beam moves toward the vehicle longitudinal direction front side and smashes against the projecting portion during a rear collision, or the like, whereby the movement of the connection beam toward the vehicle longitudinal direction front side, that is, the movement of the connection beam in the direction toward the battery is restricted.

Further, since the load-receiving portion is provided at the battery frame as mentioned above, the movement of the connection beam toward the vehicle longitudinal direction front side is restricted by the load-receiving portion and the projecting portion, minimizing the possibility of the connection beam breaking into the battery frame.

According to this structure, since the rigidity of the projecting portion is lower than the rigidity of the connection beam, when the connection beam smashes against the projecting portion, the projecting portion deforms (e.g., is crushed) and thus absorbs the impact energy. Further, the space defined between the projecting portion and the battery can serve as a space for deformation of the projecting portion, minimizing the possibility of the projecting portion hitting the battery when the projecting portion is deforming.

The vehicle battery mounting structure of the aspect of the invention may be such that the projecting portion projects toward the vehicle longitudinal direction rear side more than the load-receiving portion does.

According to this structure, since the projecting portion projects toward the vehicle longitudinal direction rear side more than the load-receiving portion does, the connection beam, when moving toward the vehicle longitudinal direction front side, is more likely to smash against the projecting portion before it smashes against the load-receiving portion, than it would be if the projecting portion were located on the vehicle longitudinal direction front side of the load-receiving portion.

Thus, since the connection beam smashes against the projecting portion and then the load-receiving portion, the impact energy input to the projecting portion is larger than that would be input to it if the vehicle battery mounting structure were adapted to cause the connection beam to smash against the load-receiving portion and then the projecting portion. Thus, the amount of deformation of the projecting portion is larger, and therefore the projecting portion can more efficiently absorb the impact energy by deforming. Accordingly, the impact energy transferred to the battery via the projecting portion, the rear wall, and so on, can be reduced.

According to the structure described above, further, the connection beam smashes against the load-receiving portion after the deformation of the projecting portion, and this further restricts the movement of the connection beam toward the vehicle longitudinal direction front side. As such, the movement of the connection beam toward the vehicle longitudinal direction front side is restricted by the projecting portion and the load-receiving portion, minimizing the possibility of the connection beam breaking into the battery frame.

The vehicle battery mounting structure of the aspect of the invention may be such that the projecting portion is provided at a vehicle lateral direction middle portion of the rear wall, and the load-receiving portion is provided at each of both sides of the projecting portion in the lateral direction of the vehicle.

According to this structure, the projecting portion is provided at the vehicle lateral direction middle portion of the rear wall. The projecting portion projects toward the vehicle longitudinal direction rear side more than the load-receiving portions provided, respectively, on the both sides of the projecting portion in the lateral direction of the vehicle do. As such, since the projecting portion, which projects toward the vehicle longitudinal direction rear side more than the load-receiving portions do, is provided at the vehicle lateral direction middle portion of the rear wall, when the connection beam is moving toward the vehicle longitudinal direction front side at a certain angle to the rear wall, the connection beam is highly likely to smash against the projecting portion before smashing against one of the load-receiving portions.

Thus, as compared to a case where the connection beam smashes against the load-receiving portion before smashing against the projecting portion, the impact energy input to the projecting portion is large, and thus the amount of deformation of the projecting portion is larger, allowing the projecting portion to more efficiently absorb the impact energy by deforming. As a result, the impact energy transferred to the battery via the projecting portion, the rear wall, and so on, is reduced.

Accordingly, the foregoing vehicle battery mounting structures minimize the possibility of the connection beam breaking into the battery frame.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, vehicle battery mounting structures according to example embodiments of the invention will be described with reference to the drawings. Note that in the drawings the arrow FR points at the front side of the vehicle in its longitudinal direction (will be referred to as "vehicle longitudinal direction front side" where necessary for descriptive conveniences), the arrow UP points at the upper side of the vehicle in its vertical direction (will be referred to as "vehicle vertical direction upper side" where necessary for descriptive conveniences), the arrow RH points at an outer side (right side) of the vehicle in its lateral direction, and the arrow LH points at another outer side (left side) of the vehicle in its lateral direction. Further, in this specification, the members, portions, and the like, whose positions should be specified in relation to the longitudinal, vertical, and lateral directions of the vehicle will be termed with "vehicle longitudinal direction", "vehicle vertical direction", and "vehicle lateral direction".

First, a vehicle battery mounting structure according to a first example embodiment will be described.

Figure 1:
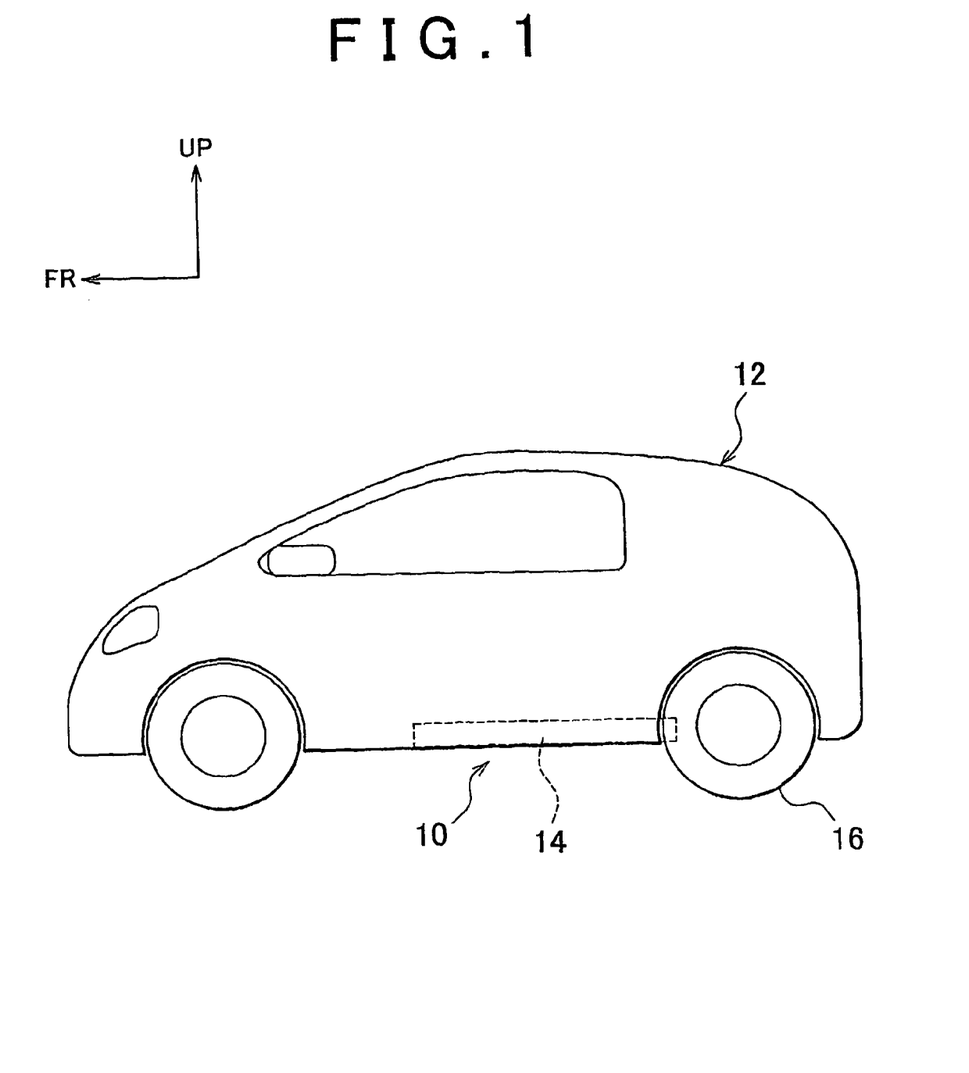
FIG. 1 shows a vehicle incorporating a vehicle battery mounting structure of a first example embodiment of the invention, as viewed externally in the lateral direction of the vehicle.

FIG. 1 shows, by way of example, a vehicle 12 incorporating a vehicle battery mounting structure 10 of the first example embodiment. The vehicle 12 is an electric vehicle that runs using an electric motor (not shown in the drawings) as its drive force source. A battery pack 14 storing therein the electric power to be supplied to the electric motor is mounted under the floor of the vehicle 12. As such, the vehicle battery mounting structure 10 of the first example embodiment is incorporated in the vehicle 12 having the battery pack 14 mounted under the floor of the vehicle 12, in other words, on the vehicle vertical direction lower side of a floor panel (not shown in the drawings).

Figure 2:
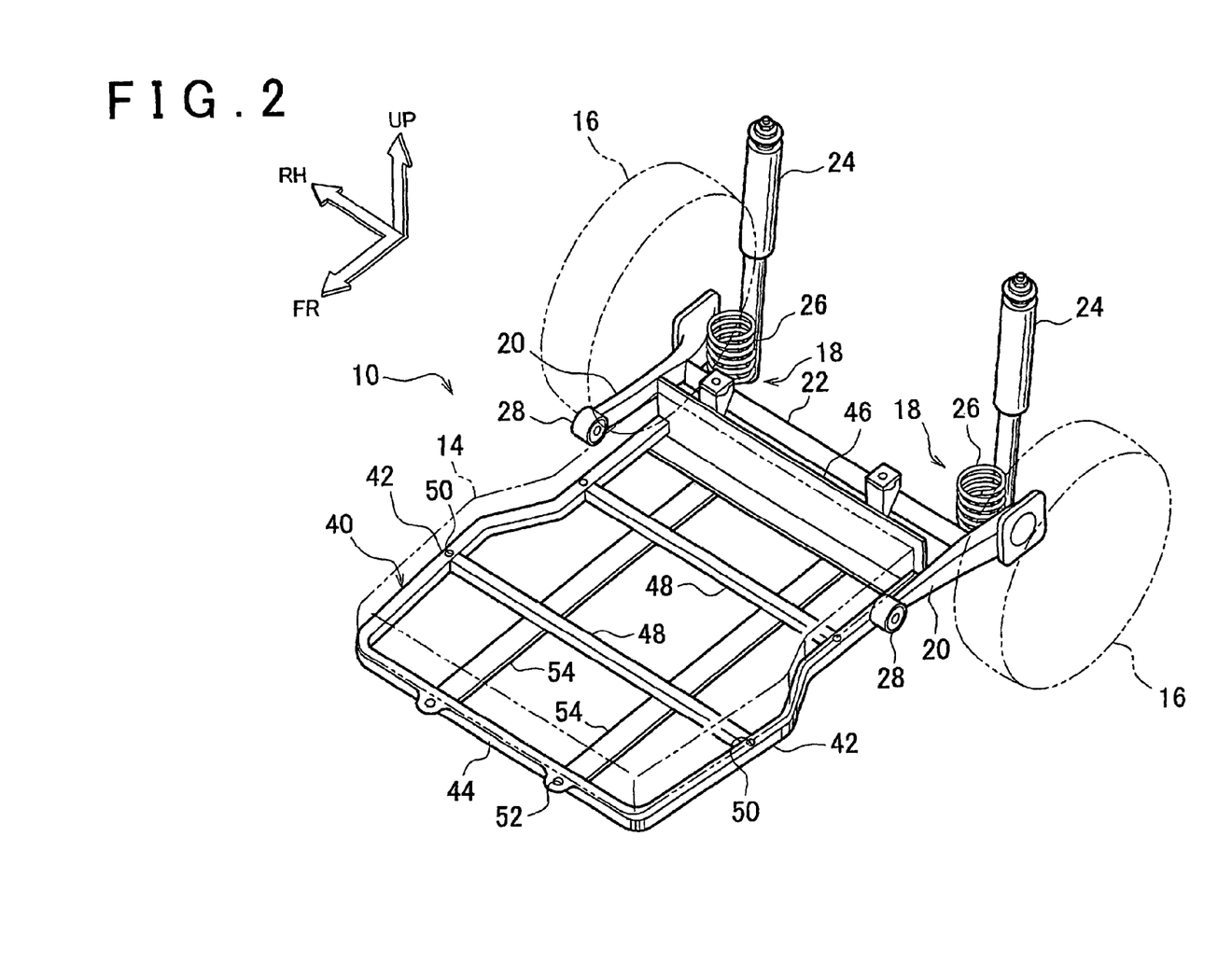
FIG. 2 is a perspective view showing a battery frame and a rear suspension system in the first example embodiment of the invention.

Referring to FIG. 2, a rear suspension system 18 supporting the rear wheels 16 is provided at the rear section of the vehicle 12. The rear suspension system 18 is constituted of a pair of left and right suspension arms 20 extending in the longitudinal direction of the vehicle 12, an intermediate beam (axle beam) 22 extending in the lateral direction of the vehicle 12 and serving as a connection beam via which vehicle longitudinal direction intermediate portions of the left and right suspension arms 20 are connected to each other, shock absorbers 24 provided at the vehicle longitudinal direction rear ends of the respective suspension arms 20, coil springs 26 provided on the vehicle longitudinal direction front sides of the respective shock absorbers 24, and so on.

Suspension arm bushes 28 are provided at the vehicle longitudinal direction front ends of the respective suspension arms 20. The suspension arm bushes 28 are rotatably connected to a vehicle frame (not shown in the drawings), and the suspension arms 20 are pivotably connected to the vehicle frame such that they are pivotable about the respective suspension arm bushes 28.

Figure 3:
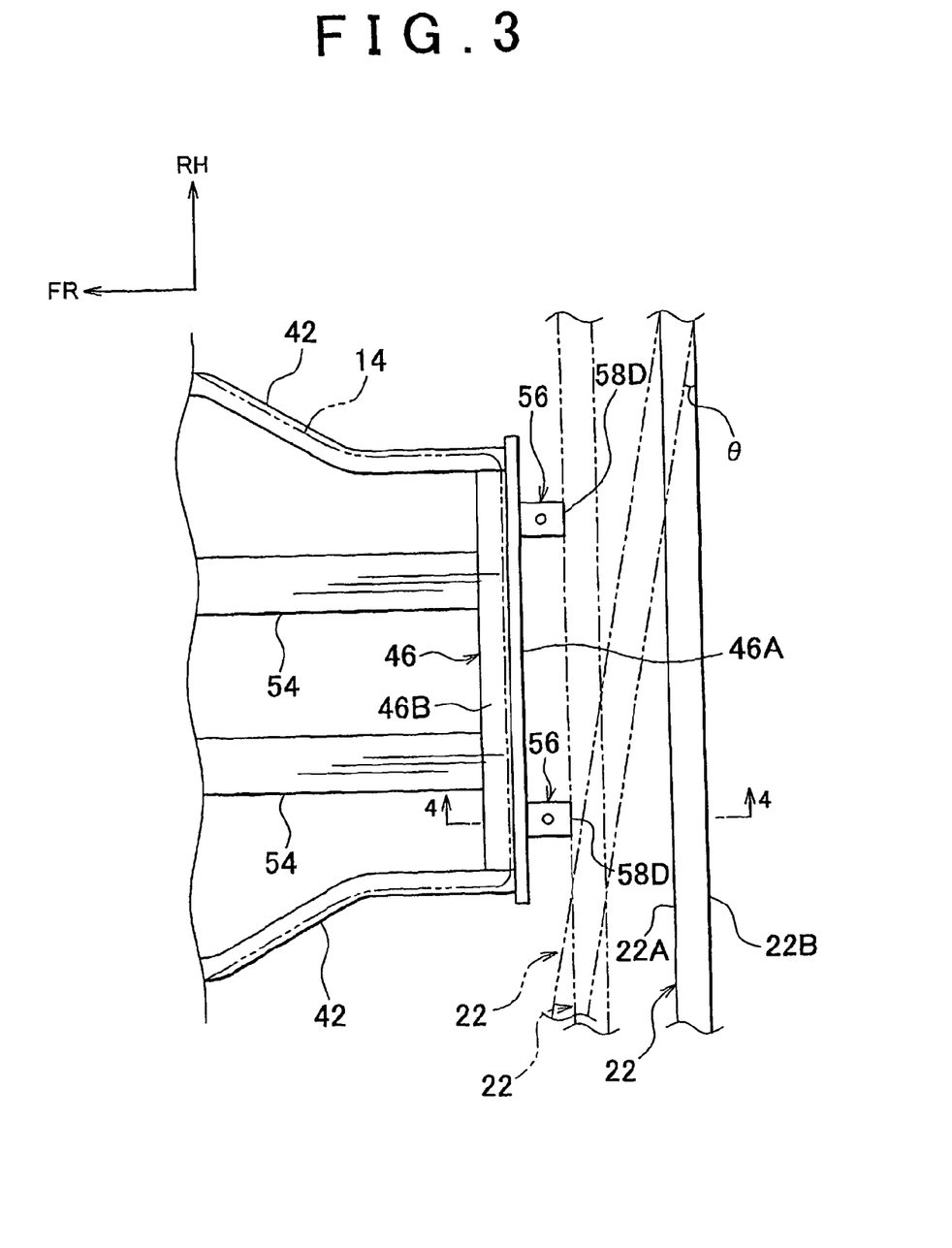
FIG. 3 shows the battery frame and an intermediate beam in the first example embodiment of the invention, as viewed from the vehicle vertical direction upper side.
Figure 4:
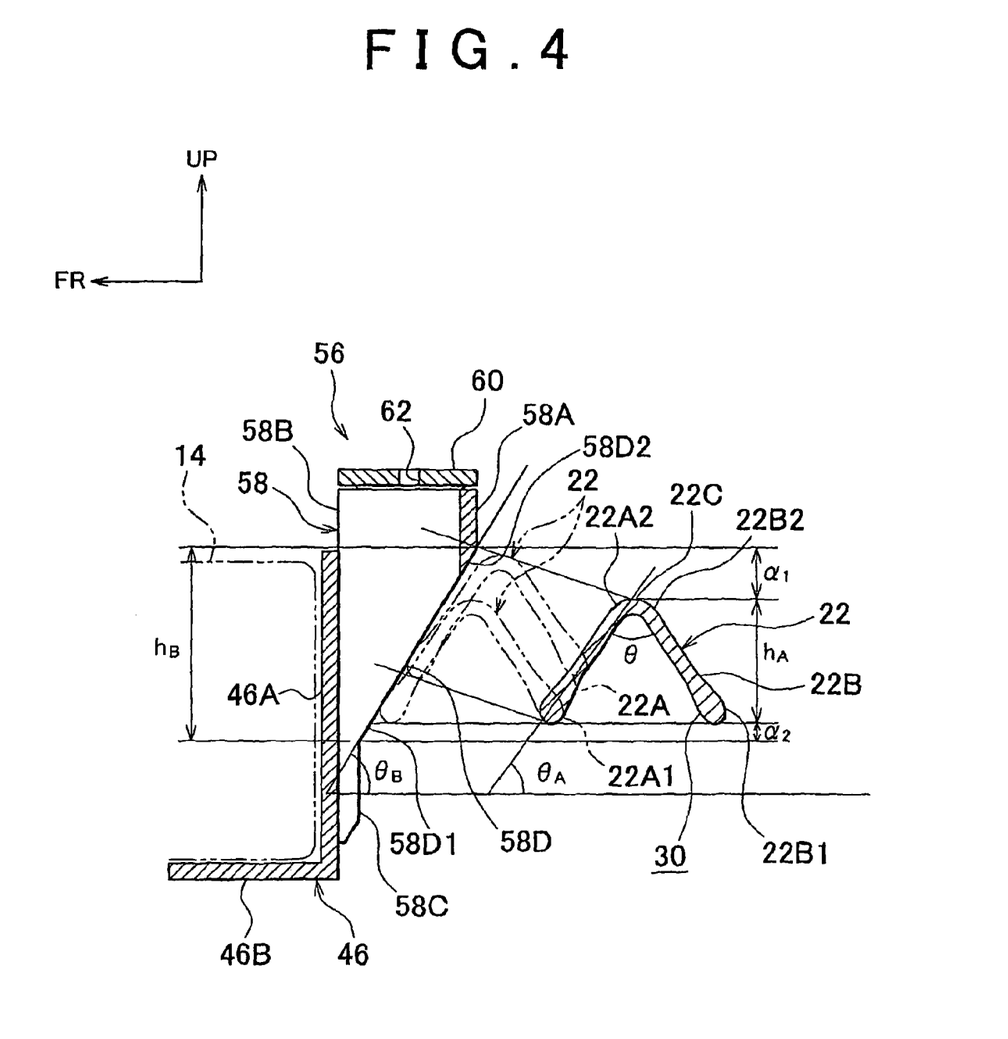
FIG. 4 is a cross sectional view taken along the 4-4 line in FIG. 3.

Referring to FIGS. 3 and 4, the intermediate beam 22 connecting the left and right suspension arms 20 to each other has an inverted-V-shaped open cross section having an opening 30 (refer to FIG. 4) facing toward the vehicle vertical direction lower side, and the intermediate beam 22 has a bent portion 22C bent in an arc shape, a front wall 22A extending from the bent portion 22C into the vehicle longitudinal direction front side, and a rear wall 22B extending from the bent portion 22C into the vehicle longitudinal direction rear side. The front wall 22A and the rear wall 22B meet at a predetermined angle θ, being connected via the bent portion 22C to each other at their vehicle vertical direction upper end portions 22A2 and 22B2.

The front wall 22A is inclined at a predetermined inclination angle $\theta_A$ ($0<\theta_A<90°$) with respect to the horizontal plane, and the vehicle vertical direction upper end portion 22A2 is located on the vehicle longitudinal direction rear side of an opening-side end portion 22A1.

In this example embodiment, the bent portion 22C corresponds to the vehicle vertical direction upper end of the intermediate beam 22, and the opening-side end portion 22A1 of the front wall 22A and an opening-side end portion 22B1 of the rear wall 22B correspond to the vehicle vertical direction lower end of the intermediate beam 22.

Referring to FIG. 2, a battery frame 40 supporting the battery pack 14 from the vehicle vertical direction lower side is provided on the vehicle longitudinal direction front side of the intermediate beam 22. The battery pack 14 is constituted of a plurality of chargeable and dischargeable storage batteries (not shown in the drawings) housed in a case. The external form of the battery pack 14 is indicated using double-dot chain lines in FIG. 2. The battery pack 14 is mounted on the battery frame 40 and fixed on it using bolts, or the like (not shown in the drawings).

The battery frame 40 is, as a whole, frame-shaped, having a pair of left and right battery side frames 42 extending in the longitudinal direction of the vehicle 12, a battery front frame 44 extending in the lateral direction of the vehicle 12 and connecting the vehicle longitudinal direction front ends of the respective battery side frames 42 to each other, and a rear wall 46 extending in the lateral direction of the vehicle 12 and connecting the vehicle longitudinal direction rear ends of the respective battery side frames 42 to each other.

Multiple battery sub-frames 48 extending in the lateral direction of the vehicle 12 (two battery sub-frames 48 in this example embodiment) are provided between the left and right battery side frames 42 and spaced from each other in the longitudinal direction of the vehicle 12. The left and right battery side frames 42 are connected to each other via the battery sub-frames 48, achieving a desired rigidity of the battery frame 40.

Multiple attachment holes 50, serving as mount portions, are formed at the battery side frames 42, and multiple attachment holes 52, serving as mount portions, are formed at the battery front frame 44. The battery side frames 42 and battery front frame 44 are fixed on a vehicle body frame (not shown in the drawings) via bolts, or the like (not shown in the drawings), that are inserted into the respective attachment holes 50 and 52 and then screwed into the vehicle body frame.

Multiple battery under covers 54 (two battery under covers 54 in this example embodiment) covering the battery pack 14 from the vehicle vertical direction lower side are attached on the vehicle vertical direction lower side of the battery frame 40. The battery under covers 54 extend in the longitudinal direction of the vehicle 12 and spaced from each other in the lateral direction of the vehicle 12. The battery under covers 54 are joined to the battery front frame 44, the battery sub frames 48, and the rear wall 46 by welding, or the like.

As shown in FIG. 3, the rear wall 46 is arranged between the battery pack 14 and the intermediate beam 22 such that the longitudinal direction of the rear wall 46 coincides with the lateral direction of the vehicle 12. As shown in FIG. 4, the rear wall 46 is L-shaped in cross section, having a rear cover portion 46A covering the battery pack 14 from the vehicle longitudinal direction rear side and a lower cover portion 46B extending from the vehicle vertical direction lower end of the rear cover portion 46A toward the vehicle longitudinal direction front side and covering the battery pack 14 from the vehicle vertical direction lower side.

Figure 5:
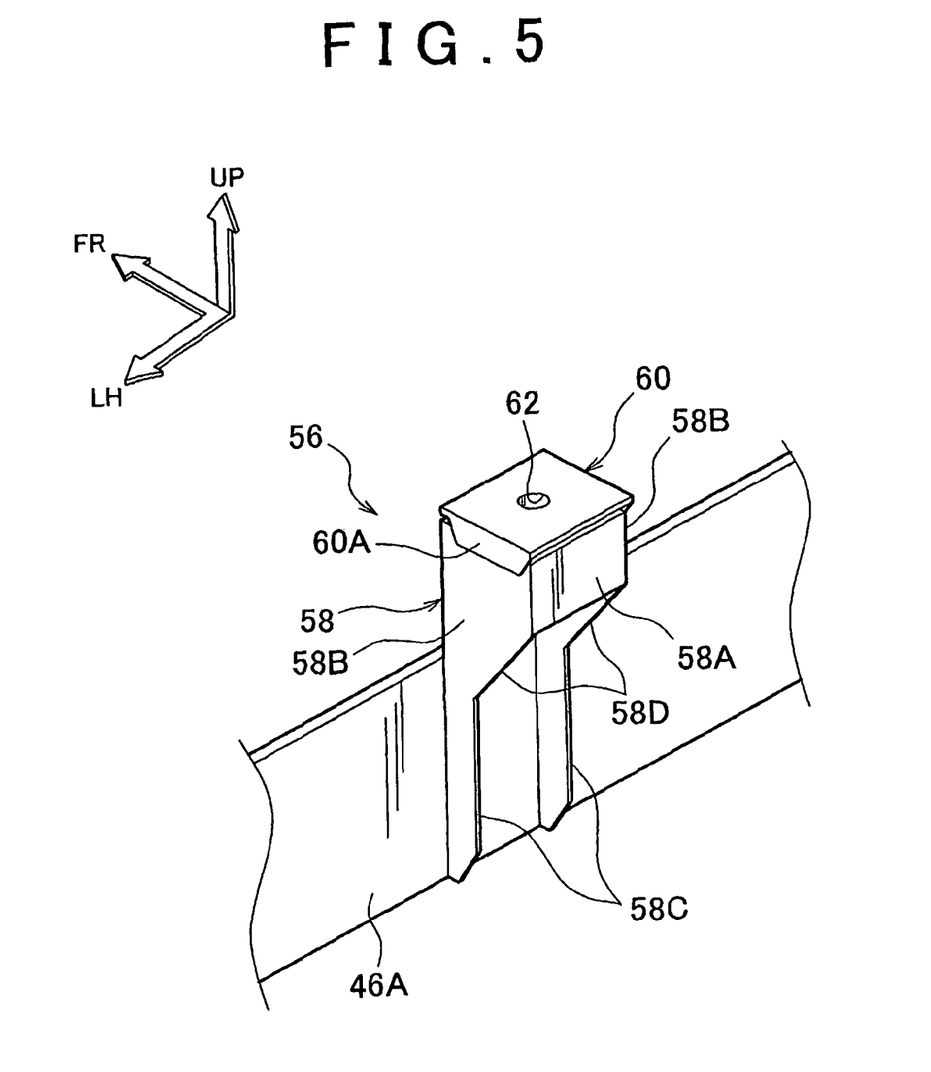
FIG. 5 is a perspective view of an attachment bracket in the first example embodiment of the invention.

Two vehicle body attachment brackets 56 to be attached to the vehicle body (not shown in the drawings) are provided, respectively, at the both vehicle lateral direction end portions of the rear cover portion 46A. As shown in FIG. 5, each vehicle body attachment bracket 56 has a bracket body 58 and a flange 60 attached on the top of the bracket body 58.

The bracket body 58 has a flat wall 58A substantially parallel to the rear cover portion 46A, a pair of sidewalls 58B extending, respectively, from the both vehicle lateral direction ends of the flat wall 58A toward the vehicle longitudinal direction front side, and base portions 58C extending from the vehicle vertical direction lower ends of the respective sidewalls 58B toward the vehicle vertical direction lower side. The vehicle longitudinal direction front ends of the sidewalls 58B and base portions 58C are in face-to-face contact with the rear cover portion 46A and joined to it by welding, or the like.

On the other hand, ribs 60A extending toward the vehicle vertical direction lower side are provided, respectively, at the both vehicle lateral direction ends of the flange 60. The ribs 60A are joined to the respective sidewalls 58B of the bracket body 58 by welding, or the like, whereby the flange 60 is attached on and thus integrated with the bracket body 58. Further, an attachment hole 62 serving as a mount portion is formed at the flange 60. A bolt (now shown in the drawings) is inserted into the attachment hole 62 and then screwed into the vehicle frame (not shown in the drawings), whereby the rear wall 46 is fixed to the vehicle frame.

As shown in FIG. 4, each sidewall 58B of the bracket body 58 has a load-receiving portion 58D that is inclined, obliquely extending from the vehicle vertical direction upper end of the base portion 58C toward the vehicle vertical direction lower end of the flat wall 58A. The load-receiving portions 58D are located between the rear cover portion 46A and the intermediate beam 22. Thus, as indicated using double-dot chain lines in FIGS. 3 and 4, when the intermediate beam 22 moves toward the vehicle longitudinal direction front side (i.e., in the direction indicated by the arrow FR) during a rear collision, or the like, the front wall 22A of the intermediate beam 22 smashes against the load-receiving portions 58D.

Meanwhile, FIG. 3 illustrates, using double-dot chain lines, two example states in one of which the intermediate beam 22 has moved to the vehicle longitudinal direction front side at an angle θ to the rear wall 46 and in the other of which the intermediate beam 22 has moved to the vehicle longitudinal direction front side in parallel (i.e., at no angle) to the rear wall 46. FIG. 4 illustrates, using double-dot chain lines, two example states in one of which the intermediate beam 22 has moved to the vehicle longitudinal direction front side and in the other of which the intermediate beam 22 has moved to a diagonally upper side of the vehicle 12.

Meanwhile, the rigidity of the load-receiving portions 58D is, owing to their material, etc., higher than that of the intermediate beam 22, and therefore the intermediate beam 22 deforms when smashing against the load-receiving portions 58D. Further, the load-receiving portions 58D extend in a plane inclined at a predetermined inclination angle $\theta_B$ ($0 < \theta_B < 90°$) to the horizontal plane, and a vehicle vertical direction upper end portion 58D2 (i.e., the flat wall 58A side end portion) of each load-receiving portion 58D is, as viewed externally in the lateral direction of the vehicle 12, located on the vehicle longitudinal direction rear side of a vehicle vertical direction lower end portion 58D1 (i.e., the base portion 58C side end portion) of the load-receiving portion 58D. According to this structure, when the intermediate beam 22 is smashing against the load-receiving portions 58D during a rear collision, or the like, a diagonally upper side of the intermediate beam 22 is blocked by the load-receiving portions 58D, whereby the movement of the intermediate beam 22 toward the vehicle vertical direction upper side (i.e., in the direction indicated by the arrow UP) is restricted, as well as the movement toward the vehicle longitudinal direction front side (i.e., in the direction indicated by the arrow FR).

Basically, it suffices that each load-receiving portion 58D is, as a whole, inclined such that the vehicle vertical direction upper end portion 58D2 is located, as viewed externally in the lateral direction of the vehicle 12, on the vehicle longitudinal direction rear side of the vehicle vertical direction lower end portion 58D1. Therefore, for example, each load-receiving portion 58D may be curved at least a portion thereof to be convexed toward the vehicle longitudinal direction front side, or may be stepped, having one or more steps.

The inclination angle $\theta_B$ of the load-receiving portions 58D is larger than the inclination angle $\theta_A$ of the front wall 22A of the intermediate beam 22 ($\theta_B > \theta_A$). Thus, when the intermediate beam 22 is moving toward the vehicle longitudinal direction front side during a rear collision, or the like, the opening-side end portion 22A1 of the front wall 22A of the intermediate beam 22 smashes against the load-receiving portions 58D before the bent portion 22C of the intermediate beam 22 does.

In the first example embodiment, further, the vehicle vertical direction upper end portion 58D2 of each load-receiving portion 58D is located on the vehicle vertical direction upper side of the bent portion 22C of the intermediate beam 22, and the vehicle vertical direction lower end portion 58D1 of each load-receiving portion 58D is located on the vehicle vertical direction lower side of the opening-side end portion 22A1 of the front wall 22A of the intermediate beam 22.

More specifically, a height $h_B$ of the load-receiving portions 58D is set to satisfy the inequality (1) below. Thus, the load-receiving portions 58D are capable of receiving the entirety of the intermediate beam 22, and the intermediate beam 22 smashes against the load-receiving portions 58D even when the intermediate beam 22 is moving toward the diagonally upper side or diagonally lower side of the vehicle 12 during a rear collision, or the like.

$$h_B \geq h_A + \alpha_1 + \alpha_2 \quad (1)$$

$h_B$: The height of the load-receiving portions 58D

$h_A$: The height of the intermediate beam 22

$\alpha_1$: The maximum amount by which the intermediate beam 22 moves toward the vehicle vertical direction upper side during a rear collision, or the like ($\alpha_1 \geq 0$)

$\alpha_2$: The maximum amount by which the intermediate beam 22 moves toward the vehicle vertical direction lower side during a rear collision, or the like ($\alpha_2 \geq 0$)

Note that $\alpha_1$ and $\alpha_2$ are set to zero if it is not necessary to factor in the movements of the intermediate beam 22 toward the diagonally upper side and diagonally lower side of the vehicle 12. Further, the inequality (1) shown above is a general-purpose inequality regardless of the shape of the intermediate beam 22, and thus it is applicable to, for example, an intermediate beam having a U-shaped cross section or circular cross section, as well as the intermediate beam 22 having an inverted-V-shaped cross section as in the first example embodiment. Further, the inequality (1) is no more than an example, and thus various other expressions may be used. That is, basically, it suffices that at least a portion of each load-receiving portion 58D is located on the vehicle longitudinal direction front side of the intermediate beam 22. Therefore, for example, the height $h_B$ of the load-receiving portions 58D may be smaller than the height $h_A$ of the intermediate beam 22.

Next, the effects of the vehicle battery mounting structure 10 of the first example embodiment will be described.

Figure 6:
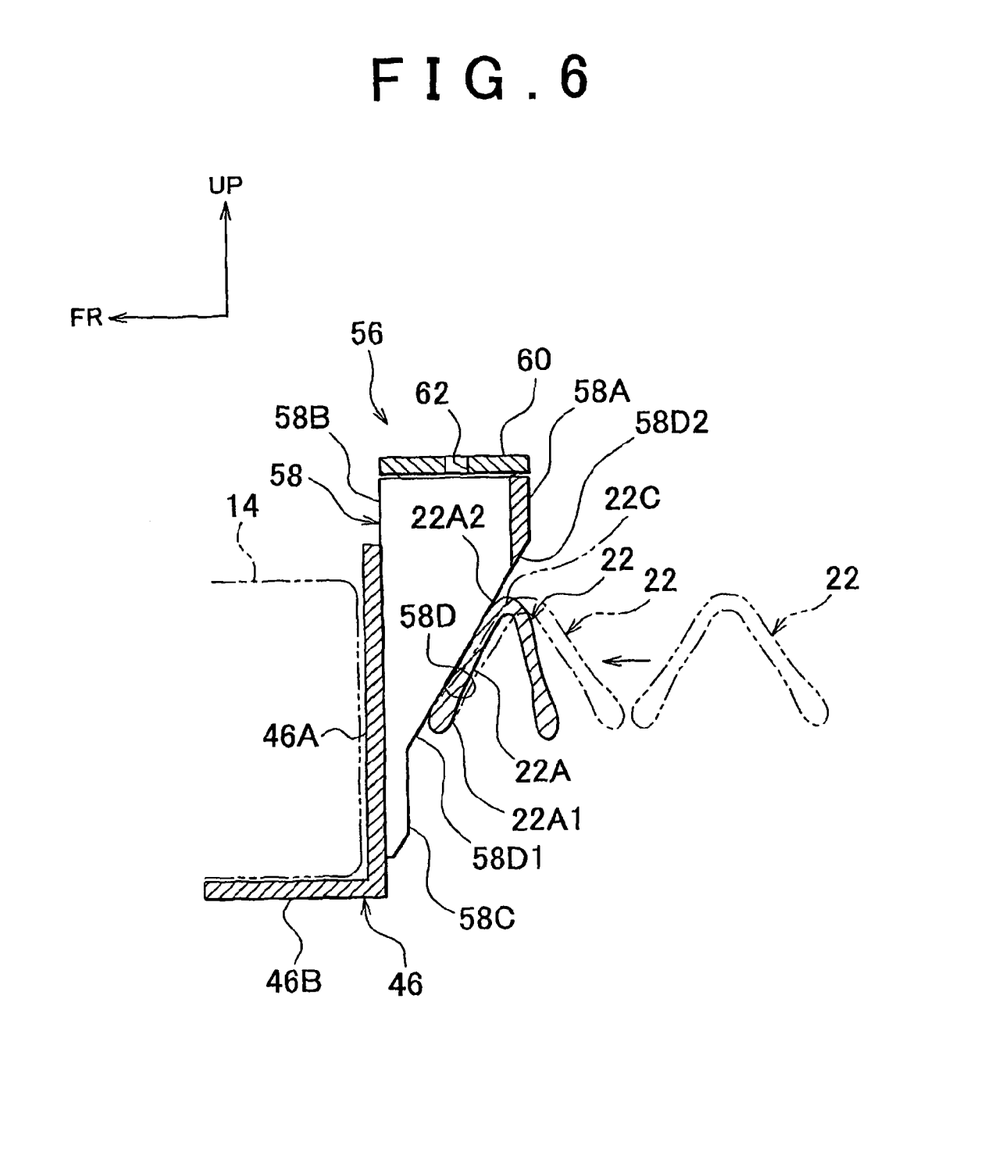
FIG. 6 is a view corresponding to FIG. 4 and illustrating how the intermediate beam moves and deforms.

As shown in FIG. 6, the vehicle body attachment brackets 56 are attached on the rear cover portion 46A of the rear wall 46, and the bracket body 58 of each vehicle body attachment bracket 56 has the load-receiving portions 58D that are located between the rear wall 46 of the battery frame 40 and the intermediate beam 22. Thus, for example, when the intermediate beam 22 moves toward the vehicle longitudinal direction front side (i.e., in the direction indicated by the arrow FR) and smashes against the load-receiving portions 58D during a rear collision, or the like, as indicated using double-dot chain lines in FIG. 3, the movement of the intermediate beam 22 toward the vehicle longitudinal direction front side, that is, the movement of the intermediate beam 22 in the direction toward the battery pack 14 is restricted.

Further, each load-receiving portion 58D is inclined at the predetermined inclination angle $\theta_B$ (refer to FIG. 4) with respect to the horizontal plane and the vehicle vertical direction upper end portion 58D2 is located on the vehicle longitudinal direction rear side of the vehicle vertical direction lower end portion 58D1, as viewed externally in the lateral direction of the vehicle 12. According to this structure, when the intermediate beam 22 is smashing against the load-receiving portions 58D, a diagonally upper side of the intermediate beam 22 is blocked by the load-receiving portions 58D, whereby the movement of the intermediate beam 22 toward the vehicle vertical direction upper side is restricted, as well as the movement of the intermediate beam 22 toward the vehicle longitudinal direction front side. This, for example, minimizes the possibility of the intermediate beam 22 smashing against the parts, components, and the like, that are present on the vehicle vertical direction upper side of the load-receiving portions 58D (e.g., floor panels, vehicle body frames).

Further, since the rigidity of the load-receiving portions 58D is higher than that of the intermediate beam 22, when smashing against the load-receiving portions 58D, the intermediate beam 22 deforms and thus absorbs the impact energy. Therefore, the impact load transferred to the battery pack 14 via the load-receiving portions 58D, the rear wall 46, and so on, are reduced.

Especially, since the inclination angle $\theta_B$ of the load-receiving portions 58D is set larger than the inclination angle $\theta_A$ of the front wall 22A of the intermediate beam 22 ($\theta_B > \theta_A$) in the first example embodiment, when the intermediate beam 22 is moving toward the vehicle longitudinal direction front side during a rear collision, or the like, the opening-side end portion 22A1 of the front wall 22A of the intermediate beam 22 smashes against the load-receiving portions 58D before the bent portion 22C of the intermediate beam 22 does. Therefore, as indicated using solid lines in FIG. 6, the front wall 22A of the intermediate beam 22 deforms pivotally about the bent portion 22C, narrowing the opening 30, and thus a greater moment acts on the intermediate beam 22. As such, the deformation efficiency of the intermediate beam 22 is higher, and thus the intermediate beam 22 can more efficiently absorb the impact energy by deforming. As a result, the impact load transferred to the battery pack 14 via the load-receiving portions 58D, the rear wall 46, and so on, are further reduced.

Meanwhile, in order to facilitate the deformation of the intermediate beam 22, a groove (bead) extending in the longitudinal direction of the intermediate beam 22 may be provided at the outer side of the bent portion 22C of the intermediate beam 22 (i.e., the surface at the side on which tensile force acts when the bent portion 22C is bent). Further, in order to facilitate the intermediate beam 22 to deform when the intermediate beam 22 is smashing against the load-receiving portions 58D, the flexural rigidity of the load-receiving portions 58D may be larger than the flexural rigidity (as measured circumferentially around the member axis) of the intermediate beam 22.

Further, in the first example embodiment, the vehicle vertical direction upper end portion 58D2 of each load-receiving portion 58D is located on the vehicle vertical direction upper side of the bent portion 22C of the intermediate beam 22, that is, the load-receiving portions 58D are located on the vehicle longitudinal direction front side of the bent portion 22C of the intermediate beam 22.

If the vehicle vertical direction upper end portion 58D2 of each load-receiving portion 58D were located on the vehicle vertical direction lower side of the bent portion 22C of the intermediate beam 22, for example, only the lower portion of the front wall 22A of the intermediate beam 22 would smash against the load-receiving portions 58D, and therefore the intermediate beam 22 could possibly rotate so as to move the bent portion 22C toward the vehicle longitudinal direction front side with respect to the lower portion of the front wall 22A, and then move toward the vehicle vertical direction upper side along the load-receiving portions 58D and the flat wall 58A and then toward the vehicle longitudinal direction front side beyond the vehicle body attachment brackets 56. Further, the intermediate beam 22 can possibly move toward the diagonally upper side of the vehicle 12, as well as the vehicle longitudinal direction front side. In such a case, the intermediate beam 22 is more likely to move beyond the vehicle body attachment brackets 56.

According to the first example embodiment, on the other hand, since the vehicle vertical direction upper end portion 58D2 of each load-receiving portion 58D is located on the vehicle vertical direction upper side of the bent portion 22C of the intermediate beam 22, the intermediate beam 22 can be entirely received by the load-receiving portions 58D. According to the first example embodiment, further, the position, relative to the bent portion 22C of the intermediate beam 22, of the vehicle vertical direction upper end portion 58D2 of each load-receiving portion 58D is set based on the maximum movement amount $\alpha_1$ in the inequality (1), representing the maximum amount by which the intermediate beam 22 moves toward the vehicle vertical direction upper side. Therefore, as indicated by the upper double-dot chain lines in FIG. 4, even if the intermediate beam 22 moves toward the diagonally upper side of the vehicle 12 during a rear collision, or the like, the intermediate beam 22 can be entirely received by the load-receiving portions 58D. This reduces the possibility of the intermediate beam 22 moving beyond the vehicle body attachment brackets 56, and thus the possibility of the intermediate beam 22 smashing against the parts, components, and the like, that are present on the vehicle vertical direction upper side of the vehicle body attachment brackets 56 (e.g., floor panels, vehicle body frames).

According to the first example embodiment, further, the vehicle vertical direction lower end portion 58D1 of each load-receiving portion 58D is located on the vehicle vertical direction lower side of the opening-side end portion 22A1 of the front wall 22A of the intermediate beam 22, that is, the load-receiving portions 58D are located on the vehicle longitudinal direction front side of the opening-side end portion 22A1 of the front wall 22A of the intermediate beam 22.

As such, the intermediate beam 22 can be entirely received by the load-receiving portions 58D. According to the first example embodiment, further, the position, relative to the opening-side end portion 22A1 of the front wall 22A of the intermediate beam 22, of the vehicle vertical direction lower end portion 58D1 of each load-receiving portion 58D is set based on the maximum movement amount $\alpha_2$ in the inequality (1), representing the maximum amount by which the intermediate beam 22 moves toward the vehicle vertical direction lower side. Therefore, although not shown in the drawings, even if the intermediate beam 22 moves toward the diagonally lower side of the vehicle 12 during a rear collision, or the like, the intermediate beam 22 can be entirely received by the load-receiving portions 58D. This reduces the possibility of the intermediate beam 22 smashing through the lower side of the vehicle body attachment brackets 56, and thus the possibility of the intermediate beam 22 breaking into the battery frame 40.

Meanwhile, stoppers (e.g., protrusions) for preventing or inhibiting the intermediate beam 22 from moving along the load-receiving portions 58D in the vertical direction of the vehicle 12 may be provided, respectively, at the vehicle vertical direction lower end portion 58D1 and the vehicle vertical direction upper end portion 58D2 of each load-receiving portion 58D.

Further, when another vehicle (not shown in the drawings) rear-ends the vehicle 12 with the two vehicles being offset from each other in the lateral direction of the vehicle 12, for example, the intermediate beam 22 moves toward the vehicle longitudinal direction front side at the angle θ to the rear wall 46 as indicated using double-dot chain lines in FIG. 3. In such a case, if only one vehicle body attachment bracket 56 were provided at the vehicle lateral direction center portion of the rear cover portion 46A, one of the vehicle lateral direction end portions of the intermediate beam 22 could possibly smash against the rear wall 46 before the intermediate beam 22 smashes against the load-receiving portions 58D of the vehicle body attachment bracket 56.

According to the first example embodiment, on the other hand, since the two vehicle body attachment brackets 56 are provided, respectively, at the both vehicle lateral direction end portions of the rear wall 46, even when the intermediate beam 22 moves toward the vehicle longitudinal direction front side at a certain angle to the rear wall 46, a vehicle lateral direction end portion of the intermediate beam 22 smashes against one of the two vehicle body attachment brackets 56.

Accordingly, as described above, the vehicle battery mounting structure 10 of the first example embodiment minimizes the possibility of the intermediate beam 22 breaking into the battery frame 40.

Next, a vehicle battery mounting structure according to a second example embodiment of the invention will be described. In the following, the same structural elements as those in the first example embodiment will be denoted by the same reference numerals, and their descriptions will be omitted where appropriate.

Figure 7:
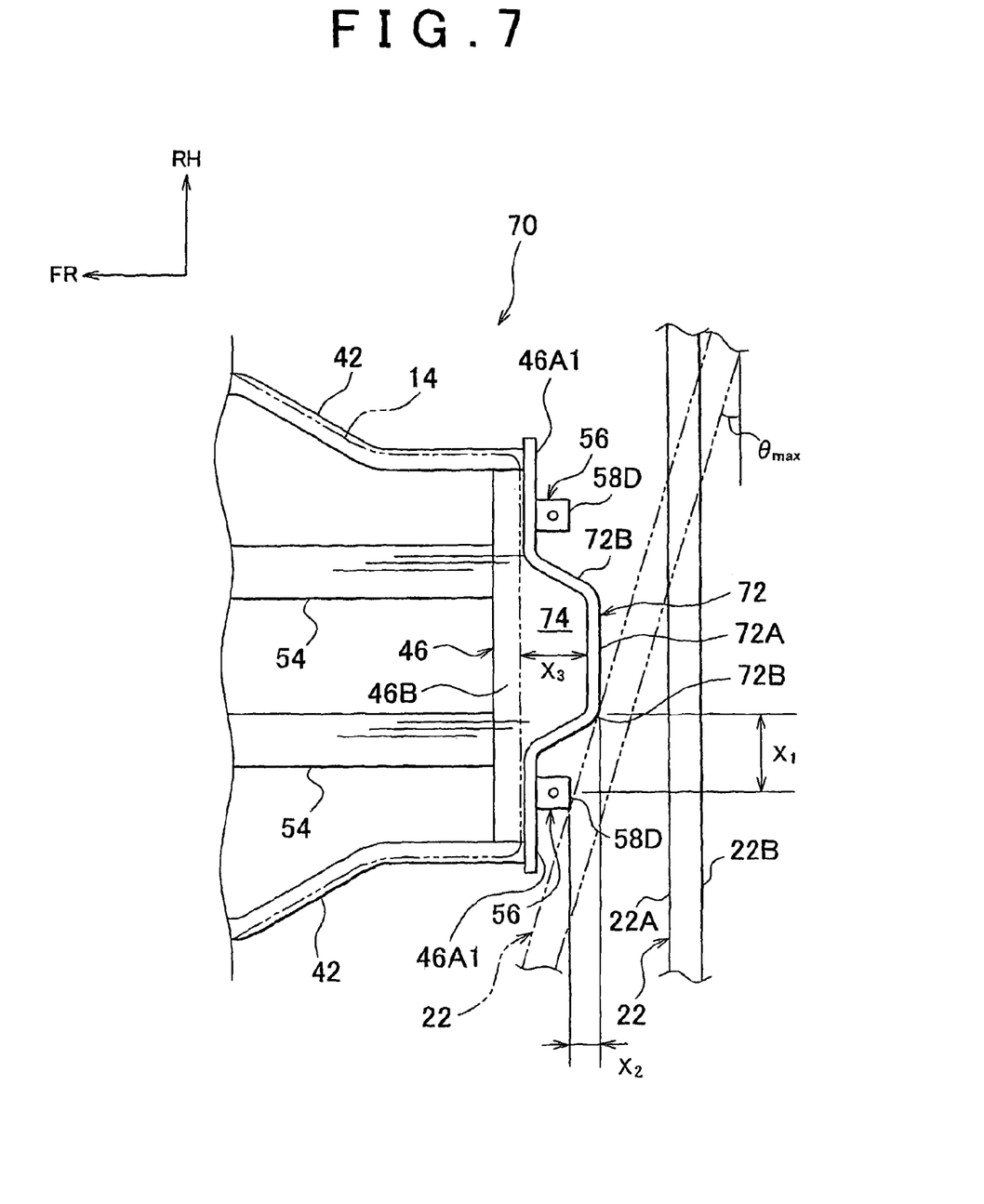
FIG. 7 shows a battery frame and an intermediate beam in a second example embodiment of the invention, as viewed from the vehicle vertical direction upper side.
Figure 8:
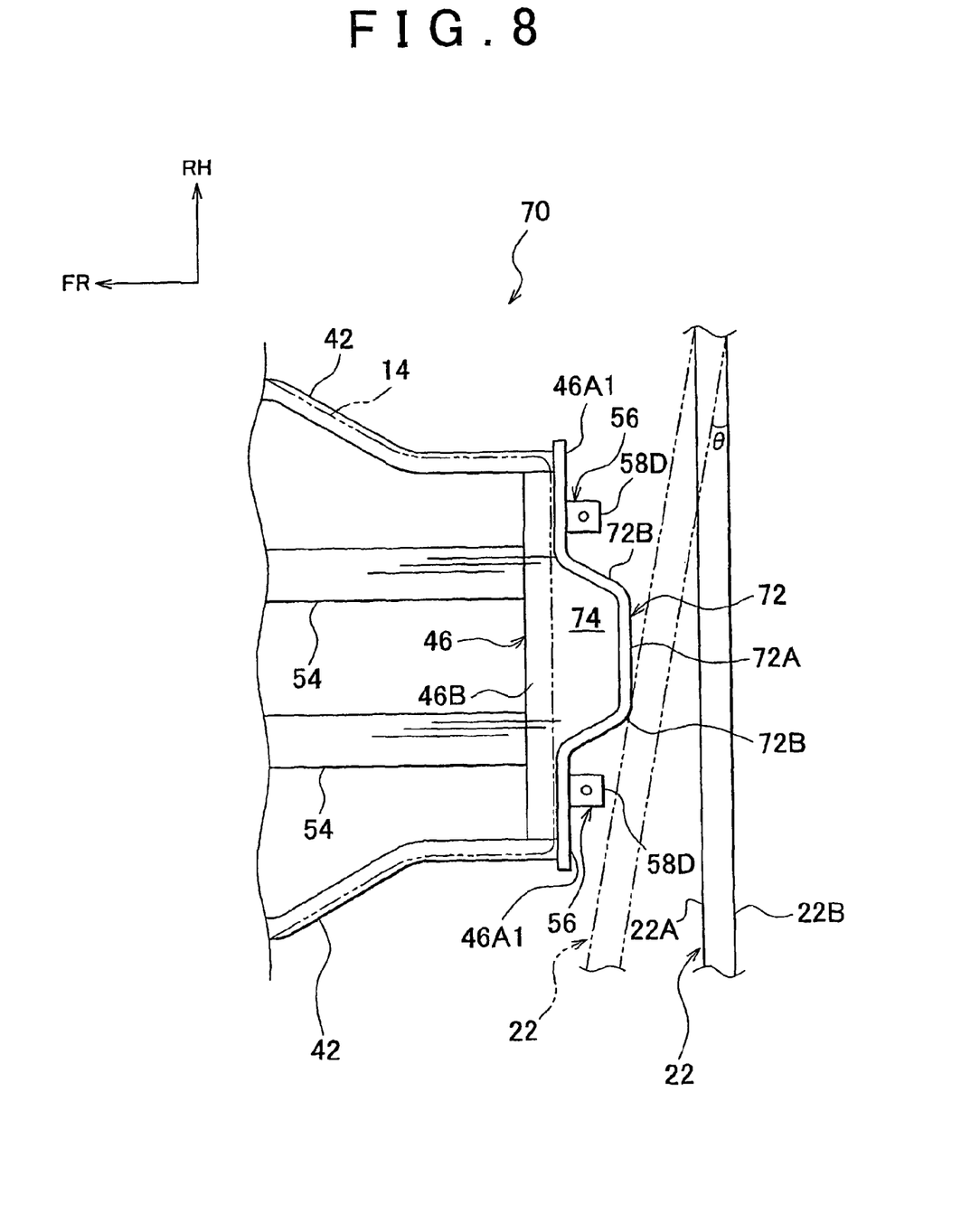
FIG. 8 shows the battery frame and intermediate beam in the second example embodiment of the invention, as viewed from the vehicle vertical direction upper side.

As shown in FIG. 7, a vehicle battery mounting structure 70 of the second example embodiment has a projecting portion 72 provided at the vehicle lateral direction middle portion of the rear cover portion 46A of the rear wall 46.

The projecting portion 72 projects toward the vehicle longitudinal direction rear side with respect to both vehicle lateral direction end portions 46A1 of the rear cover portion 46A. The projecting portion 72 has a flat wall 72A opposed to the intermediate beam 22 and corner portions 72B curving from the respective vehicle lateral direction ends of the flat wall 72A into the vehicle longitudinal direction front side. A deformation space (space) 74 is defined between the flat wall 72A and the battery pack 14. The rigidity of the projecting portion 72 is lower than that of the intermediate beam 22. Thus, when the intermediate beam 22 is smashing against the flat wall 72A or one of the corner portions 72B, the projecting portion 72 or the same corner portion 72B deforms by being crushed to the deformation space 74 side.

The two vehicle body attachment brackets 56 are provided, respectively, on both sides of the projecting portion 72 in the lateral direction of the vehicle 12. The projecting portion 72 projects toward the vehicle longitudinal direction rear side more than the vehicle body attachment brackets 56 do, and the flat wall 72A and corner portions 72B of the projecting portion 72 are located on the vehicle longitudinal direction rear side of the load-receiving portions 58D of each vehicle body attachment bracket 56.

Further, the relative positions of the corner portions 72B of the projecting portion 72 and the load-receiving portions 58D of each vehicle body attachment bracket 56 are set so as to satisfy the inequality (2) below. Thus, when the intermediate beam 22 moves toward the vehicle longitudinal direction front side at a certain angle to the rear wall 46, that is, when the intermediate beam 22 rotationally moves toward the vehicle longitudinal direction front side, the intermediate beam 22 smashes against one of the corner portions 72B of the projecting portion 72 at the same time as or before it smashes against the load-receiving portion 58D.

$$X_2/X_1 \geq \tan \theta_{max} \qquad (2)$$

$X_1$: The interval (distance) between the corner portions 72B and the load-receiving portions 58D in the lateral direction of the vehicle 12

$X_2$: The interval (distance) between the corner portions 72B and the load-receiving portions 58D in the longitudinal direction of the vehicle 12

$\theta_{max}$: The maximum rotation angle of the intermediate beam 22

Further, the distance between the flat wall 72A of the projecting portion 72 and the battery pack 14 is set so as to satisfy the inequality (3) below. As such, even when deforming during an impact with the intermediate beam 22, the projecting portion 72 does not hit the battery pack 14 before the intermediate beam 22 becomes supported by the projecting portion 72 and the load-receiving portions 58D of the vehicle body attachment bracket 56, that is, at two points.

$$X_3 > X_2 \qquad (3)$$

$X_3$: The distance between the battery pack 14 and the flat wall 72A of the projecting portion 72 in the longitudinal direction of the vehicle 12

Next, the effects of the vehicle battery mounting structure 70 of the second example embodiment will be described.

The projecting portion 72 and the vehicle body attachment brackets 56 are provided at the rear cover portion 46A of the rear wall 46. Further, the relative positions of the corner portions 72B of the projecting portion 72 and the load-receiving portions 58D of each vehicle body attachment bracket 56 are set so as to satisfy the inequality (2) above. Therefore, for example, when the intermediate beam 22 is moving toward the vehicle longitudinal direction front side at a rotation angle θ that is smaller than the maximum rotation angle $θ_{max}$ as indicated using double-dot chain lines in FIG. 7, the intermediate beam 22 smashes against one of the corner portions 72B of the projecting portion 72 before smashing against the load-receiving portions 58D of the vehicle body attachment bracket 56, whereby the movement of the intermediate beam 22 toward the vehicle longitudinal direction front side, that is, the movement of the intermediate beam 22 in the direction toward the battery pack 14 is restricted. In this way, the possibility of the intermediate beam 22 breaking into the battery frame 40 is minimized.

Further, since the rigidity of the projecting portion 72 is lower than that of the intermediate beam 22, when the intermediate beam 22 is smashing against one of the corner portions 72B of the projecting portion 72, the same corner portion 72B deforms by being crushed toward the battery pack 14 side, absorbing the impact energy. Further, the deformation space 74 is defined between the flat wall 72A of the projecting portion 72 and the battery pack 14, and it serves as a space for deformation of the corner portions 72B, minimizing the possibility of a contact between the projecting portion 72 and the battery pack 14 when the projecting portion 72 is deforming during a collision.

Accordingly, the damage to the battery pack 14 can be reduced.

Then, as the intermediate beam 22 further moves toward the vehicle longitudinal direction front side with the corner portion 72B deforming, the intermediate beam 22 smashes against the load-receiving portions 58D of the vehicle body attachment bracket 56. In this way, the impact energy is absorbed by the intermediate beam 22 deforming, and the intermediate beam 22 becomes supported by the corner portion 72B of the projecting portion 72 and the load-receiving portions 58D of the vehicle body attachment bracket 56, that is, at two points. As such, the movement of the intermediate beam 22 toward the vehicle longitudinal direction front side is further restricted.

In addition, since the intermediate beam 22 smashes against the corner portion 72B of the projecting portion 72 and then the load-receiving portions 58D as described earlier, the impact energy input to the projecting portion 72 is larger than that would be input to the projecting portion 72 if the vehicle battery mounting structure 70 were adapted to cause the intermediate beam 22 to smash against the load-receiving portions 58D before smashing against the projecting portion 72. Thus, the amount of deformation of the projecting portion 72 is larger, and therefore the projecting portion 72 can more efficiently absorb the impact energy by deforming. Accordingly, the impact energy transferred to the battery pack 14 via the projecting portion 72, the rear wall 46, and so on, can be reduced.

Meanwhile, when the intermediate beam 22 moves toward the vehicle longitudinal direction front side at the maximum rotation angle $θ_{max}$ as indicated using double-dot chain lines in FIG. 7, the intermediate beam 22 smashes against one of the corner portions 72B of the projecting portion 72 and the load-receiving portions 58D of the vehicle body attachment bracket 56 at the same time, whereby the movement of the intermediate beam 22 toward the vehicle longitudinal direction front side is restricted. Further, at this time, the impact energy is absorbed by the same corner portion 72B of the projecting portion 72 being crushed and thus deformed. Further, when smashing against the load-receiving portions 58D, the intermediate beam 22 also deforms and thus absorbs the impact energy. Accordingly, the impact energy transferred to the battery pack 14 via the rear wall 46, and so on, can be reduced.

According to the second example embodiment, thus, the impact load on the intermediate beam 22 can be received at two points, that is, by one of the corner portions 72B of the projecting portion 72 and the load-receiving portions 58D of the vehicle body attachment bracket 56. Therefore, the movement of the intermediate beam 22 in the longitudinal direction of the vehicle 12 can be reduced as compared to, for example, a case where the impact load on the intermediate beam 22 is received only by the load-receiving portions 58D, that is, at one point.

According to the second example embodiment, further, since the distance between the flat wall 72A of the projecting portion 72 and the battery pack 14 is set so as to satisfy the inequality (3) above, the space for deformation of the projecting portion 72 is at least as wide as the interval $X_2$ (refer to FIG. 7) in the longitudinal direction of the vehicle 12.

Meanwhile, the amount by which the projecting portion 72 deforms in the longitudinal direction of the vehicle 12 before the intermediate beam 22 smashes against the load-receiving portions 58D is maximum in a case where the intermediate beam 22 moves toward the vehicle longitudinal direction front side in parallel (at no angle) to the rear wall 46, as indicated using double-dot chain lines in FIG. 3. Therefore, if the space for deformation of the projecting portion 72 is at least as wide as the interval $X_2$ in the longitudinal direction of the vehicle 12 as described above, the intermediate beam 22 can be supported by the projecting portion 72 and the load-receiving portions 58D, that is, at two points, while preventing the deformed projecting portion 72 from hitting the battery pack 14.

While the projecting portion 72 is formed to be generally trapezoidal as viewed from above in the second example embodiment, it may be formed otherwise. For example, the projecting portion 72 may be rectangular or convex in cross section. Further, while the rear wall 46 and the projecting portion 72 are integrally provided as a single part in the second example embodiment, they may be provided otherwise. For example, the rear wall 46 and the projecting portion may be provided as separate parts and the projecting portion may be joined to the rear cover portion 46A of the rear wall 46 by welding, bolting, or the like. Further, for example, a buffer member (e.g., an elastic member) may be provided in the deformation space 74 for the projecting portion 72, provided that the deformation space 74 can be made as large as required. Further, the projecting portion 72 is not necessarily formed to project toward the vehicle longitudinal direction rear side more than the load-receiving portions 58D do. That is, the vehicle body attachment brackets 56 may project toward the vehicle longitudinal direction rear side more than the projecting portion 72 does.

Next, other modifications of the first and second example embodiments will be described.

While each load-receiving portion 58D is inclined such that the vehicle vertical direction upper end portion 58D2 is located on the vehicle longitudinal direction rear side of the vehicle vertical direction lower end portion 58D1 as viewed externally in the lateral direction of the vehicle 12 in the first and second example embodiments, each load-receiving portion 58D may be formed otherwise. That is, basically, it suffices that each load-receiving portion 58D can restrict the movement of the intermediate beam 22 toward the vehicle longitudinal direction front side when the intermediate beam 22 smashes against the load-receiving portion 58D. Therefore, for example, each load-receiving portion 58D may be formed to extend in a vertical plane. However, as mentioned earlier, the load-receiving portions 58D are preferably inclined, because they can be used to restrict also the movement of the intermediate beam 22 toward the vehicle vertical direction upper side.

Further, while the vehicle body attachment brackets 56 are arranged at the rear cover portion 46A of the rear wall 46 in the first and second example embodiments, they may be arranged otherwise. That is, basically, it suffices that the vehicle body attachment brackets 56 are located between the battery frame 40 and the intermediate beam 22. Therefore, for example, the vehicle body attachment brackets 56 may be attached on the respective battery side frames 42 via angle bars, or the like. Further, while the two vehicle body attachment brackets 56 are provided near the respective vehicle lateral direction ends of the rear cover portion 46A of the rear wall 46 in the first and second example embodiments, it suffices that at least one vehicle body attachment bracket 56 is provided. Therefore, for example, the number and arrangement of the vehicle body attachment brackets 56 can be changed as needed.

Further, while the intermediate beam 22 is formed to be inverted-V-shaped in cross section in the first and second example embodiments, it may be formed otherwise. For example, it may be formed to be inverted-U-shaped or circular in cross section. Further, it may be formed to be V-shaped or U-shaped, having an opening at the vehicle vertical direction upper side thereof.

Further, while the battery frame 40 is, as a whole, frame-shaped in the first and second example embodiments, the battery frame 40 may be shaped otherwise. That is, basically, it suffices that the battery frame 40 is arranged below the floor of the vehicle 12 and supports the battery pack 14. Therefore, for example, the battery frame 40 may be a grid-like frame constituted of a plurality of elongated members connected to each other.

Further, while the vehicle 12 is an electric vehicle in the first and second example embodiments, the structures described above may be applied to various other vehicles. That is, the vehicle battery mounting structures of the first and second example embodiments may be applied to various vehicles, including hybrid vehicles, in which a battery is mounted on the vehicle longitudinal direction front side of an intermediate beam (connection beam) via which a pair of left and right rear suspensions are connected to each other. In particular, the vehicle battery mounting structures of the first and second example embodiments can be effectively applied to rear structures of vehicles in which a battery is mounted near an intermediate beam.

While the invention has been described with reference to the first and second example embodiments, it is to be understood that the invention is not limited to them, but may be embodied with various changes, modifications or improvements, including those attained through various combinations of structural elements in the first and second example embodiments, without departing from the scope of the invention.

The invention claimed is:

1. A vehicle battery mounting structure, comprising:
    a battery frame is arranged on a vehicle longitudinal direction front side of a connection beam, extending in a lateral direction of a vehicle, via which a pair of rear suspensions are connected to each other, and supports a battery under a floor of the vehicle;
    a rear wall that is provided at the battery frame and is arranged, along the lateral direction of the vehicle, between the battery and the connection beam; and
    a load-receiving portion that is provided at the rear wall, is arranged between the rear wall and the connection beam, and is attached on a body of the vehicle,
    wherein the connection beam has, as viewed externally in the lateral direction of the vehicle, an inverted-V-shaped open cross section having an opening at a vehicle vertical direction lower side; and
    an inclination angle of the load-receiving portion with respect to a horizontal plane is larger than an inclination angle, with respect to the horizontal plane, of the connection beam on a side thereof closer to the load-receiving portion.

2. The vehicle battery mounting structure according to claim 1, wherein the load-receiving portion is, as viewed externally in the lateral direction of the vehicle, inclined such that a vehicle vertical direction upper end of the load-receiving portion is located on a vehicle longitudinal direction rear side of a vehicle vertical direction lower end of the load-receiving portion.

3. The vehicle battery mounting structure according to claim 1, wherein the upper end of the load-receiving portion is located on a vehicle vertical direction upper side of a vehicle vertical direction upper end of the connection beam.

4. The vehicle battery mounting structure according to claim 1, wherein the lower end of the load-receiving portion is located on a vehicle vertical direction lower side of a vehicle vertical direction lower end of the connection beam.

5. The vehicle battery mounting structure according to claim 1, wherein the rear wall has a projecting portion that projects toward a vehicle longitudinal direction rear side and is formed such that a space is defined between the battery and the projecting portion.

6. The vehicle battery mounting structure according to claim 5, wherein the projecting portion projects toward the vehicle longitudinal direction rear side more than the load-receiving portion does.

7. The vehicle battery mounting structure according to claim 6, wherein the projecting portion is provided at a vehicle lateral direction middle portion of the rear wall, and the load-receiving portion is provided at each of both sides of the projecting portion in the lateral direction of the vehicle.

* * * * *